(12) United States Patent
Heller et al.

(10) Patent No.: US 11,879,961 B2
(45) Date of Patent: *Jan. 23, 2024

(54) RADAR ARRAY PHASE SHIFTER VERIFICATION

(71) Applicant: Ay Dee Kay LLC, Aliso Viejo, CA (US)

(72) Inventors: Tom Heller, Karmiel (IL); Oded Katz, Ganei-Tikva (IL); Danny Elad, Kibutz Matzuva (IL); Benny Sheinman, Haifa (IL)

(73) Assignee: Ay Dee Kay LLC, Aliso Viejo, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 17/549,643

(22) Filed: Dec. 13, 2021

(65) Prior Publication Data

US 2022/0229166 A1 Jul. 21, 2022

Related U.S. Application Data (63) Continuation of application No. 16/660,370, filed on Oct. 22, 2019, now Pat. No. 11,226,405.

(Continued)

(51) Int. Cl.
*G01S 13/36* (2006.01)
*G01S 13/524* (2006.01)
(Continued)

(52) U.S. Cl.
CPC ........... *G01S 13/36* (2013.01); *G01S 13/524* (2013.01); *G01S 13/931* (2013.01); *H01Q 3/267* (2013.01); *G01S 2013/0245* (2013.01)

(58) Field of Classification Search
CPC ...... G01S 13/36; G01S 13/524; G01S 13/931; G01S 2013/0245; G01S 2013/0254; G01S 2013/9318; G01S 2013/93185; G01S 2013/9319; G01S 2013/93271; G01S 2013/93272; G01S 13/343; G01S 13/87; G01S 7/4004; G01S 7/03; G01S 7/4026; G01S 13/762; G01S 7/40; G01S 7/4017; G01S 7/4021; H01Q 3/267; H01Q 1/3233; H01Q 3/2647; H03D 13/007; H04B 17/12; H04B 17/21
See application file for complete search history.

(56) References Cited

U.S. PATENT DOCUMENTS

| | | | | |
|---|---|---|---|---|
| 4,673,939 | A * | 6/1987 | Forrest | G01S 7/4021 342/174 |
| 5,111,208 | A * | 5/1992 | Lopez | H01Q 3/267 342/174 |
| 5,412,414 | A * | 5/1995 | Ast | G01S 7/4017 342/372 |

(Continued)

*Primary Examiner* — Bernarr E Gregory
(74) *Attorney, Agent, or Firm* — Steven Stup (57) ABSTRACT

An improved circuit configuration is disclosed for calibrating and/or verifying the operation of phase shifters in a phased array radar system. In one illustrative embodiment, a method includes: (i) programming a set of phase shifters to convert a radio frequency signal into a set of channel signals; (ii) splitting off a monitor signal from each channel signal while coupling the set of channel signals to a set of antenna feeds; and (iii) while taking the monitor signals in pairs associated with adjacent channels, measuring a relative phase between each pair of monitor signals.

20 Claims, 5 Drawing Sheets

Related U.S. Application Data (60) Provisional application No. 62/898,141, filed on Sep. 10, 2019.

(51) Int. Cl.
*G01S 13/931* (2020.01)
*H01Q 3/26* (2006.01)
*G01S 13/02* (2006.01)

(56) References Cited

U.S. PATENT DOCUMENTS

| | | | | |
|---|---|---|---|---|
| 6,462,704 B2* | 10/2002 | Rexberg | ................ | H01Q 3/267 342/372 |
| 6,747,595 B2* | 6/2004 | Hirabe | ................... | H01Q 3/267 342/372 |
| 8,013,783 B2* | 9/2011 | Lomes | ................... | H01Q 3/267 342/165 |
| 10,164,334 B2* | 12/2018 | Kareisto | ................... | G01S 7/40 |
| 11,226,405 B2* | 1/2022 | Heller | ..................... | G01S 13/36 |
| 2001/0005685 A1* | 6/2001 | Nishimori | .............. | H01Q 3/267 455/562.1 |
| 2001/0011961 A1* | 8/2001 | Rexberg | ................. | H01Q 3/267 342/368 |
| 2006/0262013 A1* | 11/2006 | Shiroma | .............. | H01Q 3/2647 342/370 |
| 2009/0109085 A1* | 4/2009 | Needham | .............. | G01S 13/762 342/174 |
| 2011/0122977 A1* | 5/2011 | Ludwig | ................ | H03D 13/007 375/346 |
| 2014/0242914 A1* | 8/2014 | Monroe | ................. | H04B 17/21 455/63.4 |
| 2015/0255868 A1* | 9/2015 | Haddad | .................. | H01Q 3/267 342/368 |

* cited by examiner

FIG. 9A ANTI-PHASE

FIG. 9B IN-PHASE

RADAR ARRAY PHASE SHIFTER VERIFICATION

CROSS REFERENCE TO RELATED APPLICATIONS

This application is a continuation of U.S. patent application Ser. No. 16/660,370, "Radar Array Phase Shifter Verification," filed on Oct. 22, 2019, now U.S. Pat. No. 11,226,405, which claims the benefit of U.S. Provisional Patent Application No. 62/898,141, filed on Sep. 10, 2019, the contents of both of which are incorporated herein by reference.

BACKGROUND

In the quest for ever-safer and more convenient transportation options, many car manufacturers are developing self-driving cars which require an impressive number and variety of sensors. Among the contemplated sensing technologies are multi-input, multi-output radar systems to monitor the distances between the car and any vehicles or obstacles along the travel path. Such systems may employ beam-steering techniques to improve their measurement range and resolution.

On the transmit side, beam-steering is often performed using a phased array, i.e., by supplying a transmit signal with different phase shifts to each of multiple antennas, the beam direction being determined by the differences between the phase shifts. As the phase differences are varied to steer the beam, it is desirable that the signal amplitudes remain the same. Device mismatch, even that due to temperature and aging, may cause distort the beam pattern and may even cause sidelobe formation. Such effects may shift the apparent direction of obstacles or create nulls that entirely "conceal" obstacles. Thus automotive radar safety standards, or engineering design prudence alone, may dictate that some mechanism be included to calibrate and/or verify proper operation of the phase shifters. Existing mechanisms for this purpose may unduly compromise the cost or reliability of the automotive radar systems.

SUMMARY

The problems identified above may be addressed at least in part by an improved circuit configuration for calibrating and/or verifying the operation of phase shifters in a phased array radar system. In one illustrative embodiment, a method includes: (i) programming a set of phase shifters to convert a radio frequency signal into a set of channel signals; (ii) splitting off a monitor signal from each channel signal while coupling the set of channel signals to a set of antenna feeds; and (iii) while taking the monitor signals in pairs associated with adjacent channels, measuring a relative phase between each pair of monitor signals.

In another illustrative embodiment, a radar system includes: a signal generator that supplies a radio frequency signal; a set of programmable phase shifters that convert the radio frequency signal into a set of channel signals; and a set of couplers that couples the set of channel signals to a set of antenna feeds, the couplers in said set providing monitor signals. The system further includes one or more power combiners that each combine a pair of monitor signals to produce a combined signal; and one or more power detectors that each convert a respective combined signal into a power level signal. A controller uses at least one said power level signal to determine a relative phase between at least one pair of channel signals in said set of channel signals.

In still another illustrative embodiment, a radar system includes: a signal generator that supplies a radio frequency signal; a set of programmable phase shifters that convert the radio frequency signal into a set of channel signals; and a set of couplers that couples the set of channel signals to a set of antenna feeds, the couplers in said set providing monitor signals. One or more phase detectors are provided to each determine a relative phase between monitor signals for a pair of adjacent channels.

Each of the foregoing embodiments can be employed individually or in conjunction, and may include one or more of the following features in any suitable combination: 1. providing an error notification if one of said relative phase measurements fails to match a difference in programmed phase shifts of the set of phase shifters. 2. acquiring sequential relative phase measurements over a range of phase settings of phase shifters associated with even channels while maintaining a phase setting of phase shifters associated with odd channels, and acquiring sequential relative phase measurements over a range of phase settings of phase shifters associated with odd channels while maintaining a phase setting of phase shifters associated with even channels. 3. providing an error notification if a difference between sequential relative phase measurements fails to match a predetermined step size. 4. determining a phase setting offset for each pair based on the relative phase measurements. 5. said determining includes measuring the relative phase over a range of phase setting differences for adjacent channels. 6. said measuring includes: combining each pair of monitor signals to form a combined signal; and measuring a power of each combined signal. 7. disabling adjustable gain amplifiers associated with odd channels while measuring the power of each combined signal; disabling adjustable gain amplifiers associated with even channels while measuring the power of each combined signal; and based on said power measurements, adjusting gains of the adjustable gain amplifiers to equalize the power of each channel signal in said set of channel signals. 8. the controller uses the at least one power level signal to determine a phase setting offset for each pair. 9. the controller determines the phase setting offset by: measuring at least one power level signal over a range of phase setting differences for adjacent channels; and identifying a power level maximum or minimum that corresponds to the phase setting offset. 10. the one or more power combiners are anti-phase combiners and the phase setting offset corresponds to a power level minimum. 11. the one or more power combiners are in-phase combiners and the phase setting offset corresponds to a power level maximum. 12. a set of adjustable gain amplifiers that amplify the set of channel signals provided to the set of couplers. 13. prior to determining the relative phase, the controller adjusts gains of the adjustable gain amplifiers to equalize power of each channel signal in the set of channel signals. 14. prior to equalizing power, the controller disables the adjustable gain amplifiers associated with odd channels while measuring the power of each combined signal; and disables the adjustable gain amplifiers associated with even channels while measuring the power of each combined signal. 15. a controller that: acquires sequential relative phase measurements over a range of phase settings of phase shifters associated with even channels while maintaining a phase setting of phase shifters associated with odd channels; acquires sequential relative phase measurements over a range of phase settings of phase shifters associated with odd channels while maintaining a phase setting of phase shifters associated with even channels; and provides an error notification if a difference between sequential relative phase measurements fails to match a predetermined step size. 16. the one or more phase detectors comprises a pair of phase detectors that determines a first relative phase between a center channel and a first adjacent channel, and a second relative phase between the center channel and a second adjacent channel, the system further comprising a controller that computes a difference between the first and second relative phases. 17. the controller provides an error notification if the difference fails to match an expected difference based on phase settings of the phase shifters associated with the center channel, the first adjacent channel, and the second adjacent channel. 18. the expected difference is $(j+l-2k)\Delta\theta_s$, with j, k, and l representing phase settings of the first adjacent channel, the center channel, and the second adjacent channel, respectively, and $\Delta\theta_s$ representing a predetermined step change.

DETAILED DESCRIPTION

It should be understood that the following description and accompanying drawings are provided for explanatory purposes, not to limit the disclosure. To the contrary, they provide the foundation for one of ordinary skill in the art to understand all modifications, equivalents, and alternatives falling within the scope of the claims.

Figure 1:
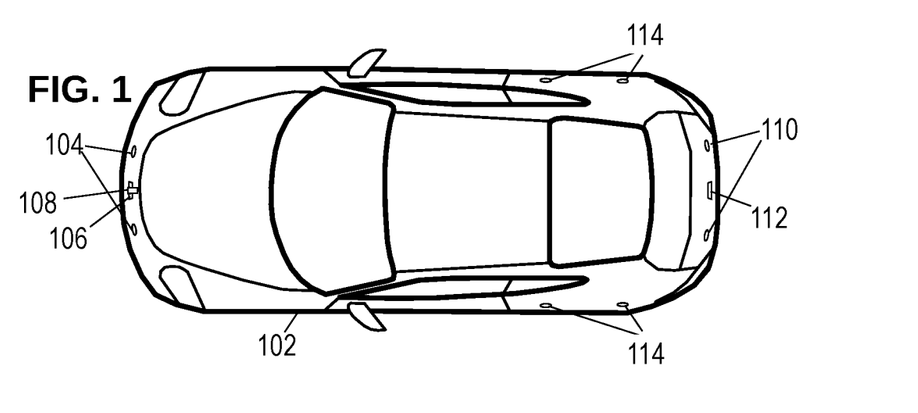
FIG. 1 is an overhead view of an illustrative vehicle equipped with sensors.

FIG. 1 shows an illustrative vehicle 102 equipped with an array of radar antennas, including antennas 104 for short range sensing (e.g., for park assist), antennas 106 for mid-range sensing (e.g., for monitoring stop & go traffic and cut-in events), antennas 108 for long range sensing (e.g., for adaptive cruise control and collision warning), each of which may be placed behind the front bumper cover. Antennas 110 for short range sensing (e.g., for back-up assist) and antennas 112 for mid range sensing (e.g., for rear collision warning) may be placed behind the back bumper cover. Antennas 114 for short range sensing (e.g., for blind spot monitoring and side obstacle detection) may be placed behind the car fenders. Each set of antennas may perform multiple-input multiple-output (MIMO) radar sensing. The type, number, and configuration of sensors in the sensor arrangement for vehicles having driver-assist and self-driving features varies. The vehicle may employ the sensor arrangement for detecting and measuring distances/directions to objects in the various detection zones to enable the vehicle to navigate while avoiding other vehicles and obstacles.

Figure 2:
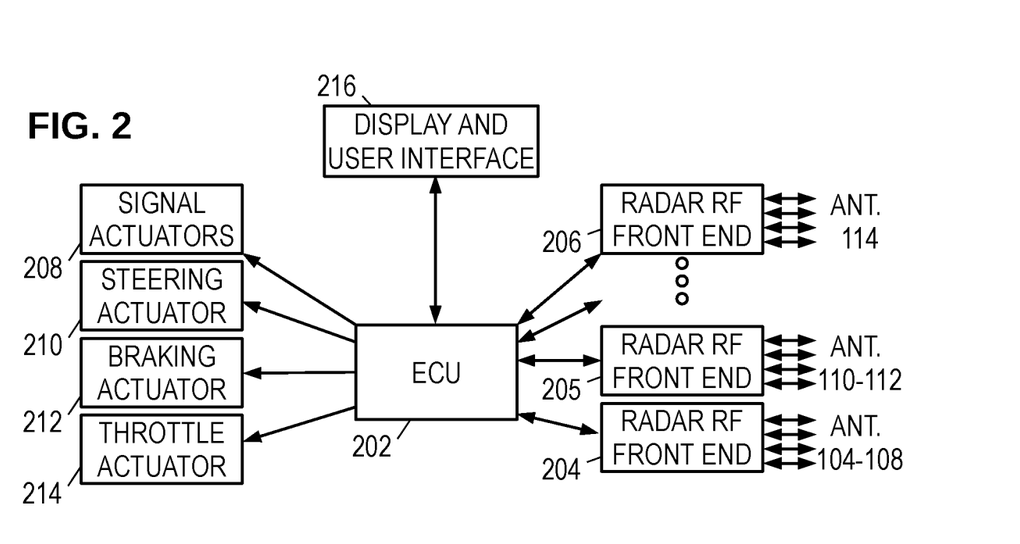
FIG. 2 is a block diagram of an illustrative driver-assistance system.

FIG. 2 shows an electronic control unit (ECU) 202 coupled to the various radar sensing front ends 204-206 as the center of a star topology. Of course, other topologies including serial, parallel, and hierarchical (tree) topologies, are also suitable and contemplated for use in accordance with the principles disclosed herein. The radar front ends each include a radio frequency (RF) transceiver which couples to some of the transmit and receive antennas 104-114 to transmit electromagnetic waves, receive reflections, and optionally to perform processing for determining a spatial relationship of the vehicle to its surroundings. (Such processing may alternatively be performed by the ECU 202.) To provide automated parking assistance, the ECU 202 may further connect to a set of actuators such as a turn-signal actuator 208, a steering actuator 210, a braking actuator 212, and throttle actuator 214. ECU 202 may further couple to a user-interactive interface 216 to accept user input and provide a display of the various measurements and system status.

Using the interface, sensors, and actuators, ECU 202 may provide automated parking, assisted parking, lane-change assistance, obstacle and blind-spot detection, autonomous driving, and other desirable features. In an automobile, the various sensor measurements are acquired by one or more electronic control units (ECU), and may be used by the ECU to determine the automobile's status. The ECU may further act on the status and incoming information to actuate various signaling and control transducers to adjust and maintain the automobile's operation. Among the operations that may be provided by the ECU are various driver-assist features including automatic parking, lane following, automatic braking, and self-driving.

To gather the necessary measurements, the ECU may employ a MIMO radar system. Radar systems operate by emitting electromagnetic waves which travel outward from the transmit antenna before being reflected back to a receive antenna. The reflector can be any moderately reflective object in the path of the emitted electromagnetic waves. By measuring the travel time of the electromagnetic waves from the transmit antenna to the reflector and back to the receive antenna, the radar system can determine the distance to the reflector. If multiple transmit or receive antennas are used, or if multiple measurements are made at different positions, the radar system can determine the direction to the reflector and hence track the location of the reflector relative to the vehicle. With more sophisticated processing, multiple reflectors can be tracked. At least some radar systems employ array processing to "scan" a directional beam of electromagnetic waves and construct an image of the vehicle's surroundings. Both pulsed and continuous-wave implementations of radar systems can be implemented, though frequency modulated continuous wave radar systems are generally preferred for accuracy.

Figure 3:
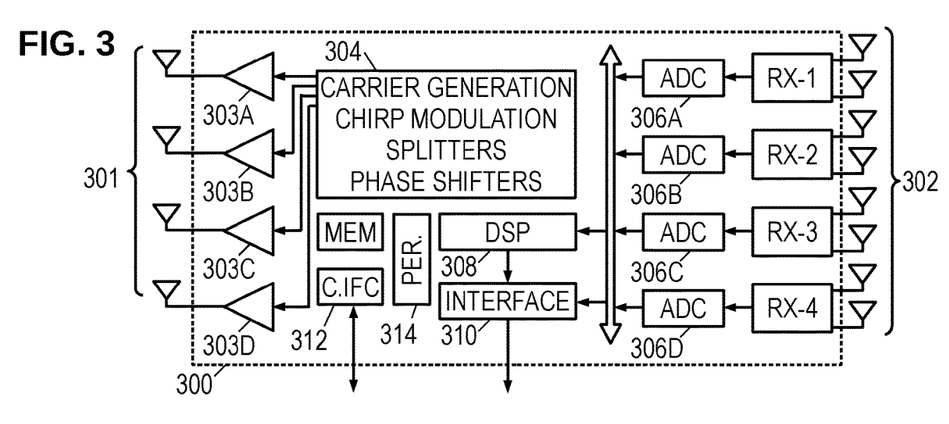
FIG. 3 is a block diagram of an illustrative radar transceiver chip.

FIG. 3 shows a block diagram of an illustrative transceiver chip 300 for a radar system. The chip 300 has antenna feeds or terminals coupled to an array of transmit antennas 301 and receive antennas 302. Adjustable gain amplifiers 303A-303D drive the transmit antennas 301 with amplified signals from transmitter circuitry 304. Circuitry 304 generates a carrier signal within a programmable frequency band, using a programmable chirp rate and range. The signal generator may employ a voltage controlled oscillator with suitable frequency multipliers. Splitters and phase shifters derive the transmit signals for the multiple transmitters TX-1 through TX-4 to operate concurrently, and further provide a reference "local oscillator" signal to the receivers for use in the down-conversion process. In the illustrated example, the transceiver chip 300 includes 4 transmitters (TX-1 through TX-4) each of which is fixedly coupled to a corresponding transmit antenna 301. In alternative embodiments, multiple transmit antennas are selectably coupled to each of the transmitters.

Chip 300 further includes 4 receivers (RX-1 through RX-4) each of which is selectably coupled to two of the receive antennas 302, providing a reconfigurable MIMO system with 8 receive antennas, four of which can be employed concurrently to collect measurements. Four analog to digital converters (ADCs) 306A-306D sample and digitize the down-converted receive signals from the receivers RX-1 through RX-4, supplying the digitized signals to a digital signal processor (DSP) 308 for filtering and processing, or directly to a high-bandwidth interface 310 to enable off-chip processing of the digitized baseband signals. If used, the DSP 308 generates image data that can be conveyed to an ECU via the high-bandwidth interface 310.

A control interface 312 enables the ECU or other host processor to configure the operation of the transceiver chip 300, including the test and calibration peripheral circuits 314 and the transmit signal generation circuitry 304.

Figure 4:
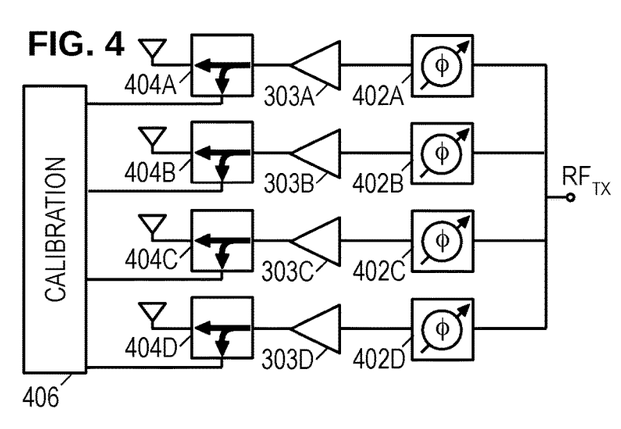
FIG. 4 is a block diagram of an illustrative phase shift transmit array.

FIG. 4 adds additional detail to illustrate the phased-array technique. A transmit signal (for automotive radar, the contemplated frequency range is the W band (75 GHz-110 GHz)) is supplied to four programmable phase shifters 402A-402D to provide respective phase shifts to the signals for each antenna. The adjustable gain amplifiers 303A-303D amplify the phase-shifted signals to drive the transmit antennas, but just before the drive signals are output from the chips, a set of couplers 404A-404D split off a small fraction of the signal power as monitor signals that enable a calibration circuit 406 to monitor the performance of the transmit circuitry.

Figure 5:
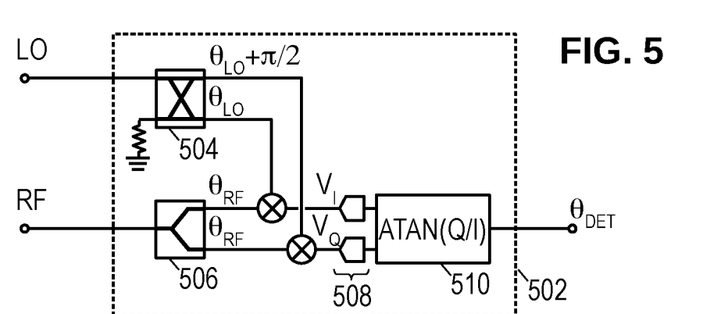
FIG. 5 is a schematic of an illustrative phase detector.

In at least some embodiments, the calibration circuit monitors the relative amplitude and phase of the drive signals. FIG. 5 is a block diagram of an illustrative phase detector 502 that may be employed at the mm-wave frequencies contemplated herein. A quadrature coupler 504 converts a local oscillator (LO) signal into two quadrature signals (signals having the same frequency, but out of phase by 90 degrees). Quadrature couplers are known in the literature, and suitable examples include branchline couplers, Lange couplers, and overlay couplers. A splitter 506 spits an RF input into two equal signals. Multipliers mix each of the quadrature signals with one of the RF signals to produce baseband voltages. The voltage obtained using the leading quadrature signal may be termed the in-phase voltage VI, while the voltage obtained using the lagging quadrature signal may termed the quadrature-phase voltage VQ. One or more ADCs 508 may digitize the voltages and a processor, ASIC, or look-up table 510 may convert the digitized voltages into a detected phase $\theta_{det}$ by performing the equivalent of an arctangent operation on the ratio of VQ to VI. The detected phase represents the phase difference between the LO and RF inputs.

Figure 6:
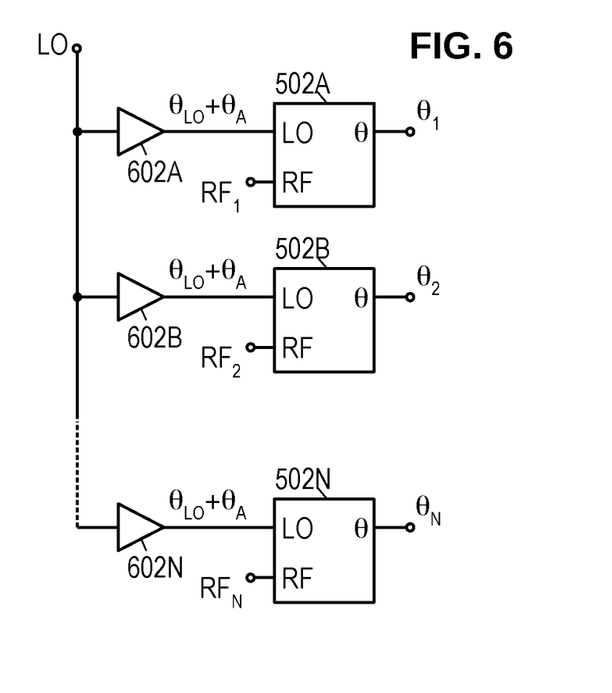
FIG. 6 is a schematic of an illustrative calibration circuit.

FIG. 6 shows an illustrative calibration circuit using a naïve approach, in which the N drive signals are each supplied to a respective RF input of a phase detector 502A-502N, and the LO inputs of the phase detectors receive a buffered copy of the LO signal from a respective amplifier 602A-602N. (Even though they impose significant areal requirements, the amplifiers are typically necessary to avoid undue loading of the LO signal source.) The phase angle measurements from the phase detectors ($\theta_i$) indicate the phase angle difference between the LO and RF inputs (with an offset representing contributions from the couplers, the amplifiers, and any routing delay differences):

$$\theta_{i,j} = \theta_{RFi} - \theta_{ref} = \theta_{PSi,j} - \theta_{LO} - \theta_{offset}$$

where $\theta_{PSi,j}$ is the jth phase shift setting of the ith phase shifter 402A-402D, i ranging from 1 to the number of phase shifters and j ranging from 1 to the number of programmable phase shifts for each phase shifter. The operation of each phase shifter can be verified by comparing the measured phase shifts $\theta_{i,j}$ for adjacent values of j and confirming that the difference matches the expected step change $\Delta\theta_s$:

$$\theta_{i,j} - \theta_{i,j+1} = \Delta\theta_s.$$

The verification may be repeated for each value of j, with wrap-around when j reaches it maximum value (the number of available phase settings).

Note that it is also desirable to ensure proper inter-channel phase differences. Issues can arise from the distribution of the LO signal to all of the phase detectors, and the phase shift associated with the amplifiers may be temperature dependent. Thus, together with the foregoing step change verification, it is desirable to perform an inter-channel phase difference verification for one or more values of j and k:

$$\theta_{i,j} - \theta_{i+1,k} = (j-k)\Delta\theta_s.$$

The inter-channel verification may be repeated for each value of i.

Figure 7:
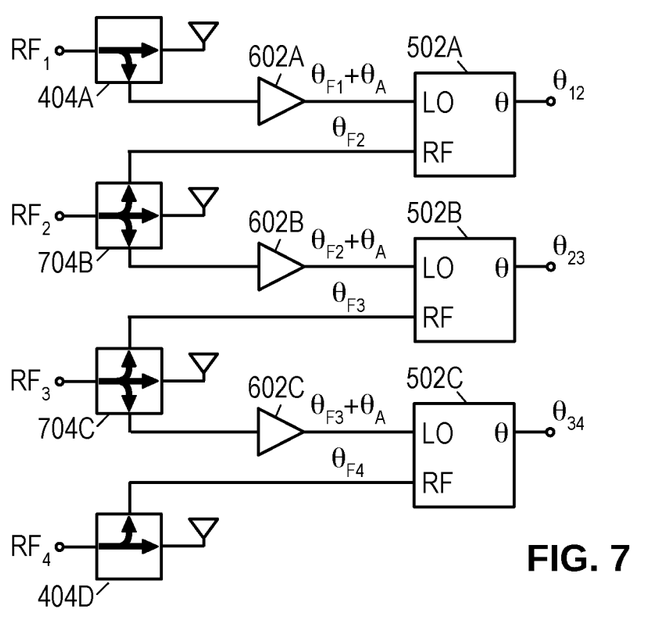
FIG. 7 is a schematic of an illustrative verification circuit.

FIG. 7 shows an illustrative verification circuit, which replaces the global LO signal with use of adjacent channels as the reference LO signal. The 3-port couplers 404A, 404D at the edges of the array are retained, but the couplers interior to the array (404B, 404C) are replaced by 4-port couplers 704B, 704C to supply monitor signals to two (rather than one) phase detectors. In at least some embodiments, the 4-port couplers consist of a directional coupler cascaded with a power splitter, while the 3-port couplers may be implemented as standard directional couplers.

As before, the couplers split off a small fraction of the RF signal power, outputting the substantial majority of the signal to the respective transmit antenna. Amplifiers 602A-602C amplify the monitor signals to drive the LO inputs of the phase detectors 502A-502C. Each phase detector 502A-502C compares the phases of monitor signals from adjacent channels. (Because the channels are compared in a pairwise fashion, one fewer phase detector is employed in this arrangement than in the arrangement of FIG. 6.)

The detected pairwise phase differences $\theta_{12}, \theta_{23}, \theta_{34}$, are $$\theta_{i(i+1),jk} = \theta_{RF(i+1),k} - \theta_{RFi,j} - \theta_{offset} = \theta_{PS(i+1),k} - \theta_{PSi,j} - \theta_{offset}$$

As before, the operation of each phase shifter can be verified by comparing the measured phase shifts for adjacent values of j or k and confirming that the difference matches the expected step change $\Delta\theta_s$:

$$\theta_{i(i+1),jk} - \theta_{i(i+1),(j+1)k} = \Delta\theta_s$$

$$\theta_{i(i+1),jk} - \theta_{i(i+1),j(k+1)} = \Delta\theta_s$$

The verification may be repeated for each value of j or each value of k, with wrap-around when j or k reaches its maximum value (the number of available phase settings).

For inter-channel phase difference verification, the difference between pairwise differences may be used (representing the phase settings of channels i, i+1, and i+2 as j, k, and l):

$$\theta_{i(i+1),jk} - \theta_{(i+1)(i+2),kl} = \theta_{PSi,j} + \theta_{PS(i+2),l} - 2\theta_{PS(i+1),k} = (j+l-2k)\Delta\theta_s.$$

The inter-channel verification may be repeated for each value of i, with wrap-around as i+1 and i+2 exceed the maximum value (the number of channels).

The intra-channel phase shift verification requires a sweep of the phase shift settings, and as such, is preferably performed between regular transmissions and as infrequently as is consistent with maintaining confidence in the proper operation of the radar system. It is expected that there may be insufficient opportunity to complete a full sweep in the time available between regular transmissions, and if that is the case, the sweep may be performed in stages and spread over multiple measurement cycles.

Conversely, the inter-channel phase shift verification does not require alteration of the phase shifter settings, and accordingly, can be performed during normal usage. If desired, the inter-channel verification can be performed concurrently with each transmission.

Because measurement differences are being used to verify operation of the phase shifters, the phase offset is canceled and it is no longer necessary to determine the offset or calibrate its dependence on age and process or temperature variation.

Figure 8:
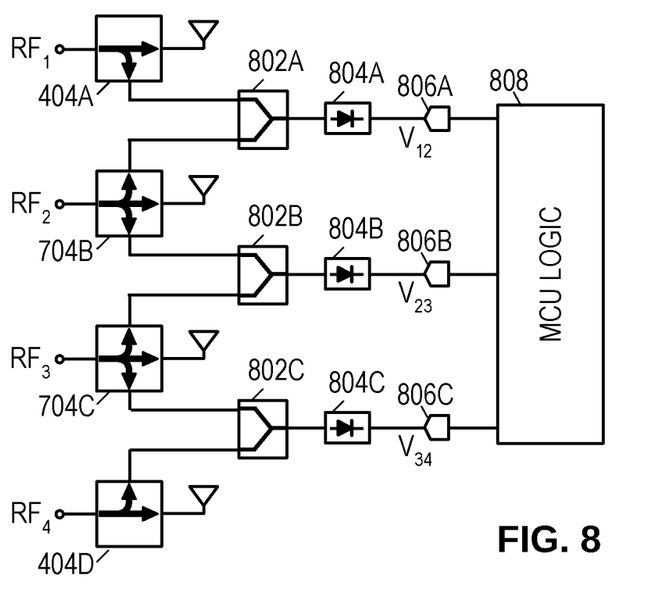
FIG. 8 is a schematic of another illustrative calibration circuit.

Though the arrangement of FIG. 7 enables verification without expressly requiring calibration, there may nevertheless be a need to calibrate the phase shifters and amplifiers of each channel to ensure accurate beam steering. To that end, FIG. 8 shows an illustrative calibration arrangement. Rather than supplying phase detectors as shown in FIG. 7, the couplers 404A, 704B, 704C, and 404D of FIG. 8 supply signals to power combiners 802A-802C. Combiner 802A combines monitor signals from couplers 404A and 704B to provide a combined signal. Combiner 802B combines signals from couplers 702B and 702C. Combiner 802C combines signals from couplers 704C and 404D.

As discussed further below, combiners 802A-802C can be in-phase power combiners or anti-phase power combiners. The combined signal output from each combiner is coupled to a power detector 804A-804C. In at least some contemplated embodiments, the power detectors rectify the combined signals using a diode or other nonlinear element. The power detectors produce a voltage indicative of the power of the combiner outputs. The output of detector 804A is labeled as V12, the output of detector 804B is labeled as V23, and the output of detector 804C is labeled as V34. These voltages are digitized by ADCs 806A-806C and provided to a microcontroller unit (MCU) logic 808. In other contemplated embodiments, a single ADC is used with a multiplexer to digitize the detector voltages.

Figure 9A:
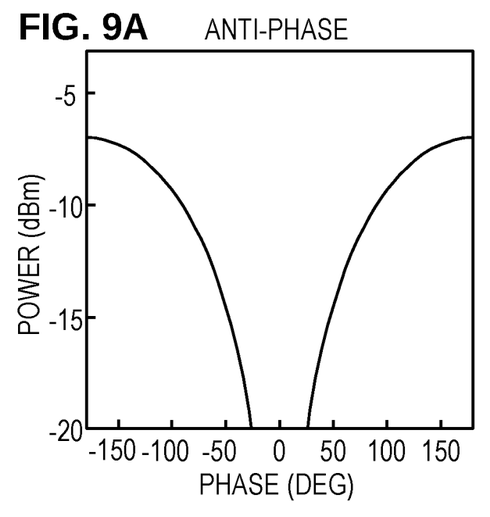
FIG. 9A is a graph of anti-phase combiner output vs. phase.
Figure 9B:
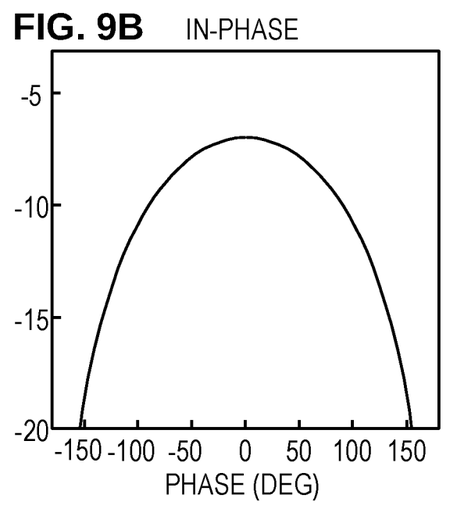
FIG. 9B is a graph of in-phase combiner output vs. phase.

As shown in FIGS. 9A-9B, the detector output voltages V depend on the relative phase between the combined signals. The graphs each assume that each of the two signals is coupled to the combiner at a power level of −10 dBm and no insertion loss. The anti-phase combiner output shown in FIG. 9A has a minimum at zero degrees and increases monotonically in each direction to maxima at ±180°. The in-phase combiner output shown in FIG. 9B has a maximum at zero degrees, decreasing monotonically to minima at ±180°. Examples of an anti-phase combiner may include a rat-race coupler, a magic tee, a branchline coupler, or a Lange coupler. These can also be configured as in-phase couplers, or the in-phase coupler may be implemented as a Wilkinson power converter.

The power detector range doesn't have to be very large to correctly detect the phase setting offset where $\theta=0$. It is only required that it be monotonic.

Let us denote the power combiner input voltages as $x_1 = A_1 \cos(\omega t)$ and $x_2 = A_2 \cos(\omega t + \theta)$. Disregarding insertion loss, the anti-phase power combiner output voltage is $y = (x_1 - x_2)/\sqrt{2}$ and the in-phase combiner output voltage is $y = (x_1 + x_2)/\sqrt{2}$. If one or the other of the phase shifters associated with the inputs to the combiner are varied, the magnitude of y varies as a function of their relative phase angle $\theta$. If $A_1 = A_2$ then y will be zero or will achieve a maximum when the relative phase angle is zero.

Figure 10A:
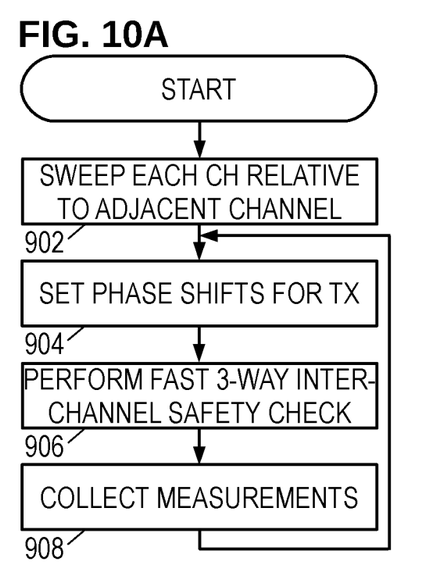
FIG. 10A is a flow diagram of an illustrative verification method.

We now discuss methods of using the verification circuit of FIG. 7 with reference to FIG. 10A. In block 902, a controller (such as DSP 308) systematically varies the settings of the phase shifters 402A-402D, to sweep the phase of each channel relative to that of its adjacent channel feeding into one of the phase detectors 502A-502C in FIG. 7. This enables the controller to verify that each adjustment of the phase setting produces a change in the phase detector output corresponding to an expected step change. If this verification is not successful, the process halts with an alert to the ECU that a fault exists in the radar system. (The controller may transmit an error code to the ECU, set the measurement to a value indicating an erroneous measurement, and/or set a field in a status register that is periodically read by the ECU.)

Otherwise, in block 904, normal operation begins with the first of a series of periodic transmit pulses. The controller sets the phase shifters to the desired setting for steering the beam from the phased transmit array in a desired direction, and generates the pulse. As the pulse is generated, the verification circuit measures the relative inter-channel phases in block 906 as discussed previously, and calculates differences between adjacent ones of the relative inter-channel phases, verifying that the difference matches an expected difference. If this verification is not successful, the process may halt with an alert to the ECU that a fault exists in the radar system.

Otherwise, in block 908, the controller collects radar echo measurements, and blocks 904-908 are repeated to collect a series of measurements. The echo measurements are processed in accordance with existing practice to determine directions and distances of obstacles relative to the vehicle.

Figure 10B:
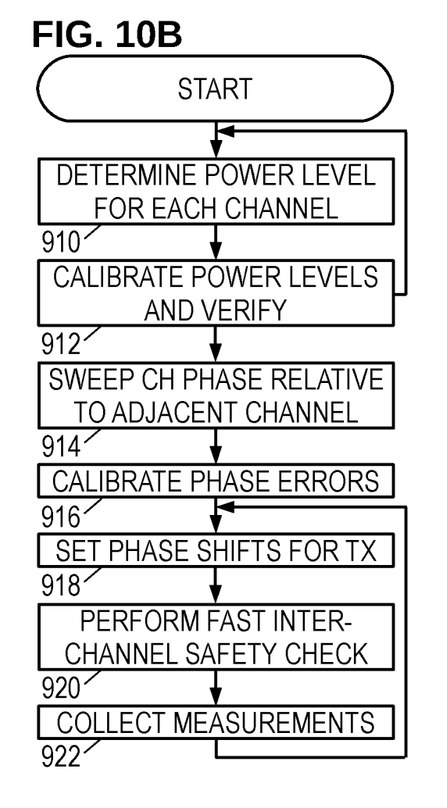
FIG. 10B is a flow diagram of an illustrative calibration method.

We now discuss methods of using the calibration circuit of FIG. 8 with reference to FIG. 10B. In block 910, a controller (such as DSP 308) measures the output level of each channel. In one contemplated approach, the controller enables only one power amplifier 303A-303D for each adjacent channel. For example, power amplifiers 303A and 303C may be enabled while power amplifiers 303B and 303D are disabled. Subsequently, power amplifiers 303A and 303C may be disabled while amplifiers 303B and 303D are enabled. The disabled power amplifiers provide no output signal.

While only one power amplifier is enabled for each pair of adjacent channels, the controller measures the output of power detectors 804A-804C. The process is repeated with the other power amplifier enabled for each pair of adjacent channels, providing the controller with a power level measurement for each channel. The controller may then equalize the power levels in block 912 by adjusting the power amplifier setting, e.g., raising the amplifier setting for the channel with the lowest power level and/or lowering the amplifier setting for the channel with the highest power level. The controller performs a verification step, repeating the operations of blocks 910 and 912 until the power levels are equal.

Once the power levels have been equalized, the controller performs phase calibration, beginning in block 914. The controller sweeps the setting of a phase shifter while holding the setting of the phase shifter on the adjacent channel constant. When the detected power level reaches a minimum (for anti-phase combiners) or a maximum (for in-phase combiners), the controller notes the relative phase shifter settings (i.e., the phase setting offset) and in block 916 designates that phase setting offset as a relative phase angle θ=0, such that desired phase differences may be achieved by suitably increasing or decreasing the relative phase shifter settings with reference to the phase setting offset. The process is performed for each pair of adjacent channels, and may be verified for all phase shift settings of each phase shifter.

Thereafter, during normal operations represented by blocks 918-922, the controller sets the phase shifters to the desired setting for steering the beam from the phased transmit array in a desired direction, and generates the pulse. As the pulse is generated, the verification circuit measures the power detector output levels in block 920 and verifies that they match the power output level expected for the desired phase shift (see FIGS. 9A-9B). If this verification is not successful, the process may halt with an alert to the ECU that a fault exists in the radar system.

Otherwise, in block 922, the controller collects radar echo measurements, and blocks 918-922 are repeated to collect a series of measurements. The echo measurements are processed in accordance with existing practice to determine directions and distances of obstacles relative to the vehicle.

It is noted that the implementation of FIG. 8 may require a much smaller silicon area since the RF signals are converted to baseband/DC using a power detector instead of a down-converting I/O mixer. Both embodiments avoid routing of long lines to a calibration receiver which, when interleaved with the RF lines that carry the TX signals, may reduce fidelity. The coupled RF signals are converted to DC immediately and are thus much easier to route.

Numerous other modifications, equivalents, and alternatives, will become apparent to those of ordinary skill in the art once the above disclosure is fully appreciated. For example each of the disclosed circuit arrangements may be used for verification or for calibration or both. It is intended that the following claims be interpreted to embrace all such modifications, equivalents, and alternatives where applicable.

What is claimed is:

1. A method, comprising:
    programming a set of phase shifters to convert a radio frequency signal into a set of channel signals;
    splitting off a monitor signal from each channel signal while coupling the set of channel signals to a set of antenna feeds;
    while taking the monitor signals in pairs associated with adjacent channels, measuring a relative phase between each pair of monitor signals; and
    selectively performing a remedial action based at least in part on at least one of the relative phase measurements.

2. The method of claim 1, wherein the remedial action comprises providing an error notification when at least the one of the relative phase measurements fails to match a difference in programmed phase shifts of the set of phase shifters.

3. The method of claim 1, further comprising:
    acquiring sequential relative phase measurements over a range of phase settings of phase shifters associated with even channels while maintaining a phase setting of phase shifters associated with odd channels; and
    acquiring sequential relative phase measurements over a range of phase settings of phase shifters associated with odd channels while maintaining a phase setting of phase shifters associated with even channels; and
    wherein the remedial action comprises providing an error notification when a difference between sequential relative phase measurements fails to match a predetermined step size.

4. The method of claim 1, further comprising determining a phase setting offset for each pair based on the relative phase measurements.

5. The method of claim 4, wherein the determining comprises measuring the relative phase over a range of phase setting differences for adjacent channels.

6. The method of claim 1, wherein the measuring comprises:
    combining each pair of monitor signals to form a combined signal; and
    measuring a power of each combined signal.

7. The method of claim 6, further comprising:
    disabling adjustable gain amplifiers associated with odd channels while measuring the power of each combined signal;
    disabling adjustable gain amplifiers associated with even channels while measuring the power of each combined signal; and
    based on the power measurements, adjusting gains of the adjustable gain amplifiers to equalize the power of each channel signal in the set of channel signals.

8. A radar system, comprising:
    a signal generator configured to supply a radio frequency signal;
    a set of programmable phase shifters configured to convert the radio frequency signal into a set of channel signals;
    a set of couplers configured to couple the set of channel signals to a set of antenna feeds, wherein the couplers in the set are configured to providing monitor signals;
    one or more power combiners each configured to combine a pair of monitor signals to produce a combined signal;
    one or more power detectors each configured to convert a respective combined signal into a power level signal; and
    a controller configured to use at least one the power level signal to determine a relative phase between at least one pair of channel signals in the set of channel signals, wherein the radar system is configured to selectively perform a remedial action based at least in part on at least the relative phase.

9. The radar system of claim 8, wherein the controller is configured to use the at least one power level signal to determine a phase setting offset for each pair.

10. The radar system of claim 9, wherein the controller is configured to determine the phase setting offset by performing operations comprising:
    measuring the at least one power level signal over a range of phase setting differences for adjacent channels; and
    identifying a power level maximum or minimum that corresponds to the phase setting offset.

11. The radar system of claim 10, wherein the one or more power combiners comprise anti-phase combiners and the phase setting offset corresponds to a power level minimum.

12. The radar system of claim 10, wherein the one or more power combiners comprise in-phase combiners and the phase setting offset corresponds to a power level maximum.

13. The radar system of claim 8, further comprising: a set of adjustable gain amplifiers configured to amplify the set of channel signals provided to the set of couplers.

14. The radar system of claim 13, wherein, prior to determining the relative phase, the controller is configured to adjust gains of the adjustable gain amplifiers to equalize power of each channel signal in the set of channel signals.

15. The radar system of claim 14, wherein, prior to equalizing power, the controller is configured to:
disable the adjustable gain amplifiers associated with odd channels while measuring the power of each combined signal; and
disable the adjustable gain amplifiers associated with even channels while measuring the power of each combined signal.

16. A radar system that comprises:
a signal generator configured to supply a radio frequency signal;
a set of programmable phase shifters configured to convert the radio frequency signal into a set of channel signals;
a set of couplers configured to couple the set of channel signals to a set of antenna feeds, wherein the couplers in the set are configured to provide monitor signals; and
one or more phase detectors each configured to determine a relative phase between monitor signals for a pair of adjacent channels, wherein the radar system is configured to selectively perform a remedial action based at least in part on at least the relative phase.

17. The radar system of claim 16, further comprising a controller configured to:
acquire sequential relative phase measurements over a range of phase settings of phase shifters associated with even channels while maintaining a phase setting of phase shifters associated with odd channels; and
acquire sequential relative phase measurements over a range of phase settings of phase shifters associated with odd channels while maintaining a phase setting of phase shifters associated with even channels;
wherein the remedial action comprises providing an error notification when a difference between sequential relative phase measurements fails to match a predetermined step size.

18. The radar system of claim 16, wherein the one or more phase detectors comprises a pair of phase detectors configured to determine a first relative phase between a center channel and a first adjacent channel, and a second relative phase between the center channel and a second adjacent channel, and wherein the radar system further comprises a controller configured to compute a difference between the first and second relative phases.

19. The radar system of claim 18, wherein the controller is configured to selectively perform the remedial action and the remedial action comprises providing an error notification when the difference fails to match an expected difference based on phase settings of the phase shifters associated with the center channel, the first adjacent channel, and the second adjacent channel.

20. The radar system of claim 19, wherein the expected difference is $(j+1-2k)\Delta\theta s$, with j, k, and 1 representing phase settings of the first adjacent channel, the center channel, and the second adjacent channel, respectively, and $\Delta\theta s$ representing a predetermined step change.

* * * * *